US006896219B2

(12) United States Patent
Borchers et al.

(10) Patent No.: US 6,896,219 B2
(45) Date of Patent: May 24, 2005

(54) PROCESS AND APPARATUS FOR NOISE REDUCTION IN MULTI-ENGINE PROPELLER-DRIVEN AIRCRAFT

(75) Inventors: Ingo Udo Borchers, Uhldingen-Muehlhofen (DE); Sigurd Haeusler, Uhldingen-Muehlhofen (DE); Michael Bauer, Immenstaad (DE); Roger Drobietz, Salem (DE); Wolfgang Gleine, Kakenstorf (DE)

(73) Assignee: Dornier GmbH, Friedrichshafen (DE)

(*) Notice: Subject to any disclaimer, the term of this patent is extended or adjusted under 35 U.S.C. 154(b) by 0 days.

(21) Appl. No.: 10/391,181

(22) Filed: Mar. 19, 2003

(65) Prior Publication Data

US 2004/0018086 A1 Jan. 29, 2004

(30) Foreign Application Priority Data

Mar. 19, 2002 (DE) ........................................ 102 12 036

(51) Int. Cl.[7] ................................................ B64C 11/50

(52) U.S. Cl. ......................... 244/1 N; 244/13; 415/119; 181/206

(58) Field of Search ........................... 244/1 N, 13, 54, 244/55, 65; 416/33, 500; 415/119; 381/71.1; 181/206

(56) References Cited

U.S. PATENT DOCUMENTS

| | | | | | |
|---|---|---|---|---|---|
| 4,900,226 | A | * | 2/1990 | de Vries | 416/34 |
| 5,150,855 | A | | 9/1992 | Kaptein | 224/1 N |
| 5,453,943 | A | * | 9/1995 | Magliozzi | 700/280 |
| 5,789,678 | A | * | 8/1998 | Pla | 73/660 |

* cited by examiner

*Primary Examiner*—Robert P. Swiatek
(74) *Attorney, Agent, or Firm*—Crowell & Moring LLP

(57) ABSTRACT

A process and system for noise reduction in multi-engine propeller-driven aircraft. The parameters of at least two propellers are adjusted with regard to frequency, amplitude, and phase so that the sound fields of the propellers are attenuated or completely extinguished by interference in the area of the closest aircraft fuselage.

35 Claims, 1 Drawing Sheet

PROCESS AND APPARATUS FOR NOISE REDUCTION IN MULTI-ENGINE PROPELLER-DRIVEN AIRCRAFT

BACKGROUND AND SUMMARY OF THE INVENTION

This application claims the priority of German Application No. 102 12 036.6-22 filed Mar. 19, 2002 the disclosure of which is expressly incorporated by reference herein.

The invention concerns a process for noise reduction in the inner and external areas of multi-engine propeller-driven aircraft.

The propellers in multi-engine propeller-driven aircraft constitute the primary noise source of inner and external noise levels. Due to the periodic operations, the noise emission of a propeller is very powerful. The frequency of the basic sound pitch is normally a function of t he number of blades and the rotation speed of the propeller. The basic sound pitch of today's propeller-driven aircraft has a low frequency. A reduction of the internal noise therefore requires, for example, the utilization of a high mass to increase the sound insulation of the fuselage structure of the aircraft. This high mass would be damaging to the performance of the aircraft. In addition, high noise levels in the outer skin of the fuselage increase the mechanical/dynamic strain on the structure.

U.S. Pat. Nos. 4,900,226 and 4,150,855 relate to control systems based on synchrophasing the propellers. In these systems, the vibrations are measured after they have reached the fuselage cabin and based upon these measurements the frequency and the phase of the plane propellers are adjusted so as to minimize the vibrations and the noise in the cabin.

It is an object of the invention to create improved processes and systems with which the noise emissions of the propeller can be significantly lowered and with which, for example, the mass necessary for sound insulation is simultaneously reduced.

This object is attained with a process for noise reduction in multi-engine propeller-driven aircraft, wherein the parameters of at least two of the propellers are adjusted with respect to each other with regard to frequency, amplitude, and phase in such a way that the sound fields of the propellers are attenuated or extinguished completely by interference in an area of a nearest fuselage of the aircraft. Advantageous features of preferred embodiments of the invention are described herein and in the claims.

In the process for the reduction of noise in propeller-driven aircraft according to the invention, the parameters of at least two of the propellers are tuned in such a way with respect to each other with regard to frequency, amplitude, and phase that the sound fields of these propellers are attenuated or in the ideal case even completely extinguished by interference in a critical area of the fuselage structure of the aircraft, at which a maximum noise level occurs due to the direct noise emission of the propellers The process according to the invention is applicable in principle to all propeller configurations as long as there is a fuselage structure in the configuration of the propeller that is directly affected by the airborne noise of at least two propellers. Such configurations are, for example:

- two engine propeller-driven aircraft wherein two propellers are mounted above the wings,
- two engine propeller-driven aircraft wherein two propellers are mounted above the fuselage,

- three engine propeller-driven aircraft wherein three propellers are mounted above the wings,
- three engine propeller-driven aircraft wherein two propellers are mounted above the wings and one propeller is mounted above the fuselage,
- four engine propeller-driven aircraft wherein two propellers each are mounted below and/or above or before and/or behind each wing,
- six engine propeller-driven aircraft wherein three propellers each are mounted below and/or above or before and/or behind each wing, and
- eight engine propeller-driven aircraft wherein four propellers each are mounted below and/or above or before and/or behind each wing.

In an advantageous exemplary embodiment of the invention of a four engine propeller-driven aircraft with two propellers mounted on each wing, the parameters of the two engines mounted on the same wing (inner and outer engine) are adjusted with respect to each other as follows. The noise emissions of the inner and outer propeller are adjusted in such a way that at least the sound field of the basic sound pitch in amplitude and phase of the inner propeller overlaps the sound field of the basic sound pitch in amplitude and phase of the outer propeller in the area nearest to the critical fuselage surface of the aircraft so that the noise level is significantly attenuated or in the ideal case even fully extinguished by interference.

The following preconditions must be met:

a) the frequencies of the basic sound pitches of the inner and outer propeller must correspond exactly;

b) the amplitudes of the basic sound pitches of the inner and outer propeller must by approximately equal in the critical fuselage area; and c) the pressure fluctuations in the basic sound pitches of the inner and outer propeller must be phase shifted by approximately 180°.

These preconditions can be fulfilled in the preferred exemplary embodiment of the invention with a four engine propeller-driven aircraft with two propellers mounted on each wing under the following conditions:

Because the outer propeller is at a greater distance from the fuselage surface, the basic sound pitch of its noise emissions must be greater in comparison to that of the inner propeller. This can be achieved, for example, by lowering the number of blades of the outer propeller in comparison with the inner propeller. In addition, the rotation speed of the outer propeller is increased with respect to the rotation speed of the inner propeller, so that the products of the number of blades and the rotation speed for the inner propeller and the outer propeller are identical. In this way, it is also ensured that the propellers have the same frequency in the basic sound pitch.

In addition, the basic sound pitch amplitudes of the propellers can be coordinated, among other things, by varying:

- the blade geometry (for example, diameter, blade depth, profile, in particular the blade tip design),
- the blade angle,
- the upstream flow conditions (for example, propeller inclination angle, pre-connection of a structure influencing the flow),
- the distance of the propeller from the critical area of the fuselage, and
- the position of the propeller along the upstream flow direction (in particular in propellers with a preferred direction of the emissions characteristic).

The requisite phase positions of the sound fields can be adjusted with respect to each other in the case under discussion (the product of the rotation speed and the number of propeller blades is constant, that is, a constant blade sequence frequency) by fine tuning the current blade position angles of the propellers (for example, adjustment of the blade phase angle or the phase differences in the propeller blade sequence), so that the sound fields are overlapped as mentioned above by a phase shift of approximately 180° in the area of the critical fuselage surface. These adjustments can be actively controlled and operated.

Additional options for adjustment of the phases of the sound field in the area of the critical fuselage surface are:

- varying the distance between the inner and outer propellers,
- varying the positions of the propellers along the upstream flow direction (especially in propellers with a preferred direction of the emission characteristic), and
- varying the propeller rotation direction.

The process according to the invention can also be applied taking into consideration several propeller sound pitches (basic sound pitch and harmonics).

The process according to the invention has the following advantages:

- significantly reduced acoustic pressures on the fuselage outer skin and therewith an increased service life (acoustic fatigue), and
- a high inner noise reduction, for example, with a significantly lower use of sound insulation for the fuselage.

Other objects, advantages and novel features of the present invention will become apparent from the following detailed description of the invention when considered in conjunction with the accompanying drawings.

DETAILED DESCRIPTION OF THE DRAWINGS

Figure 1:
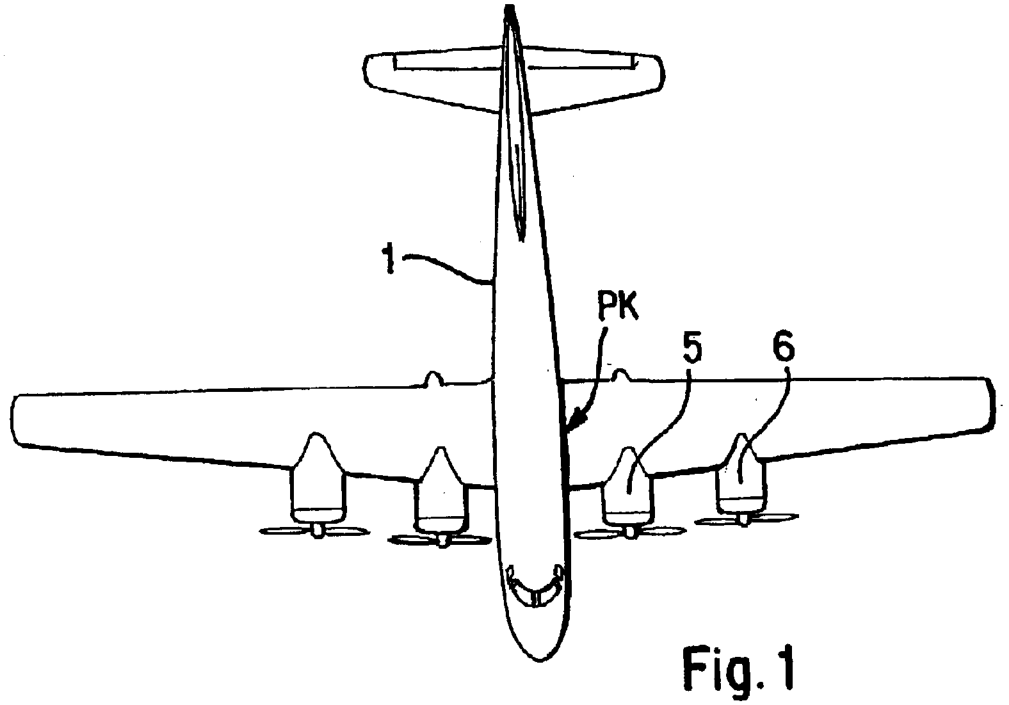
FIG. 1 is a schematic top view of a four engine airplane of the type to be configured in accordance with preferred embodiments of the invention.

The process according to the invention is explained in more detail for a four engine propeller-driven aircraft with two propellers on each wing with reference to the figures. FIG. 1 schematically depicts a top view of a four engine propeller driven aircraft including respective inboard engines 5 and outboard engines 6 as well as a fuselage with an outer skin 1. A propeller generated sound field impact area is depicted as PK at the one side of the fuselage. The other right side of the airplane is essentially symmetric with the left side.

Figure 2:
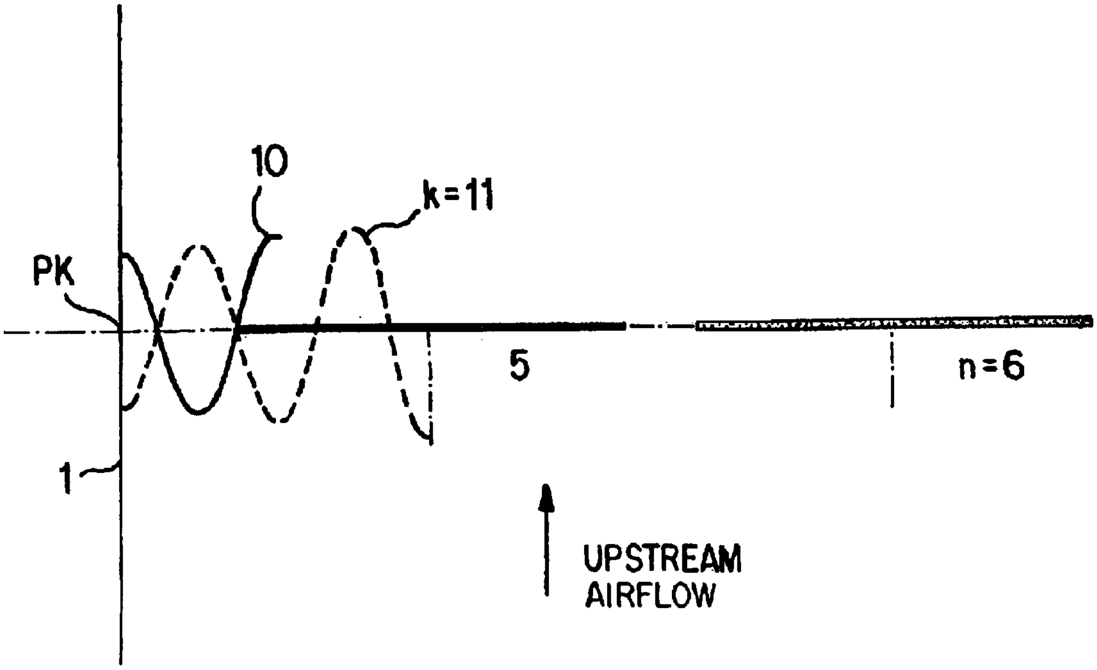
FIG. 2 is a schematic graphical depiction of the processes for configuring a multi-engine propeller driven airplane in accordance with preferred embodiments of the invention.

FIG. 2 shows a view from above and in schematic illustration of the fuselage outer skin 1 of the aircraft as well as the position of the inner propeller 5 and the outer propeller 6 on one of the wings. The sound field 10 of the inner propeller 5 as well as the sound field 11 of the outer propeller 6 are also indicated. According to the invention, the two engines 5, 6 are adjusted in such a way with respect to each other that the two sound fields overlap at the critical point PK, the nearest area of the fuselage outer skin, in such a way that they attenuate the noise level as much as possible.

For different multi-engine configurations where a respective plurality of propeller sound fields impact the fuselage at the same location, corresponding adjustments of the engines are made so that the sound fields overlap and attenuate at the noise level at the fuselage critical point The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for noise reduction in multi-engine propeller-driven aircraft, wherein parameters of at least two of the propellers are adjusted with respect to each other with regard to frequency, amplitude, and phase in such a way that the sound fields of the propellers are attenuated or extinguished completely by interference of the direct noise emission of the at least two propellers at a nearest outer skin area of a fuselage of the aircraft.

2. The process of claim 1, wherein at least the basic sound pitch of the propellers is considered in the adjustment of the engine parameters.

3. The process of claim 2, wherein in addition to the basic sound pitch, also additional propeller sound pitches are considered in the adjustment of the engine parameters.

4. The process of claim 3, wherein the adjustment of the frequencies of respective ones of the propellers takes place by adjusting at least one of the number of blades and the rotation speed of the propellers.

5. The process of claim 3, wherein the adjustment of the phases of respective ones of the propellers takes place by one or several of the following measures:

- adjusting the distances between the propellers,
- adjusting the position of the propellers along the flow direction,
- adjusting with respect to each other the current blade position angle or the phase differences in the propeller blade sequence, and
- adjusting the propeller rotation direction.

6. The process of claim 3, wherein the adjustment of the amplitudes of the propellers takes place by one or several of the following measures:

- adjusting the blade geometry,
- adjusting the rotation speed,
- adjusting the blade angle,
- adjusting the upstream flow conditions,
- adjusting the distance of the propellers to a critical area of the fuselage structure, and
- adjusting the propeller positions along the upstream flow direction.

7. The process of claim 2, wherein the adjustment of the frequencies of respective ones of the propellers takes place by adjusting at least one of the number of blades and the rotation speed of the propellers.

8. The process of claim 2, wherein the adjustment of the phases of respective ones of the propellers takes place by one or several of the following measures:

- adjusting the distances between the propellers,
- adjusting the position of the propellers along the flow direction,
- adjusting with respect to each other the current blade position angle or the phase differences in the propeller blade sequence, and
- adjusting the propeller rotation direction.

9. The process of claim 2, wherein the adjustment of the amplitudes of the propellers takes place by one or several of the following measures:

adjusting the blade geometry, adjusting the rotation speed, adjusting the blade angle, adjusting the upstream flow conditions, adjusting the distance of the propellers to a critical area of the fuselage structure, and adjusting the propeller positions along the upstream flow direction.

10. The process of claim 1, wherein the propellers are selected and adjusted in such a way that the product of blades of the propellers and the rotation speed are identical for the at least two of the propellers.

11. The process of claim 10, wherein the adjustment of the frequencies of respective ones of the propellers takes place by adjusting at least one of the number of blades and the rotation speed of the propellers.

12. The process of claim 10, wherein the adjustment of the phases of respective ones of the propellers takes place by one or several of the following measures:

adjusting the distances between the propellers, adjusting the position of the propellers along the flow direction, adjusting with respect to each other the current blade position angle or the phase differences in the propeller blade sequence, and adjusting the propeller rotation direction.

13. The process of claim 10, wherein the adjustment of the amplitudes of the propellers takes place by one or several of the following measures:

adjusting the blade geometry, adjusting the rotation speed, adjusting the blade angle, adjusting the upstream flow conditions, adjusting the distance of the propellers to a critical area of the fuselage structure, and adjusting the propeller positions along the upstream flow direction.

14. The process of claim 1, wherein the adjustment of the frequencies of respective ones of the propellers takes place by adjusting at least one of the number of blades and the rotation speed of the propellers.

15. The process of claim 14, wherein the adjustment of the phases of respective ones of the propellers takes place by one or several of the following measures:

adjusting the distances between the propellers, adjusting the position of the propellers along the flow direction, adjusting with respect to each other the current blade position angle or the phase differences in the propeller blade sequence, and adjusting the propeller rotation direction.

16. The process of claim 14, wherein the adjustment of the amplitudes of the propellers takes place by one or several of the following measures:

adjusting the blade geometry, adjusting the rotation speed, adjusting the blade angle, adjusting the upstream flow conditions, adjusting the distance of the propellers to a critical area of the fuselage structure, and adjusting the propeller positions along the upstream flow direction.

17. The process of claim 1, wherein the adjustment of the phases of respective ones of the propellers takes place by one or several of the following measures:

adjusting the distances between the propellers, adjusting the position of the propellers along the flow direction, adjusting with respect to each other the current blade position angle or the phase differences in the propeller blade sequence, and adjusting the propeller rotation direction.

18. The process of claim 1, wherein the adjustment of the amplitudes of the propellers takes place by one or several of the following measures:

adjusting the blade geometry, adjusting the rotation speed, adjusting the blade angle, adjusting the upstream flow conditions, adjusting the distance of the propellers to a critical area of the fuselage structure, and adjusting the propeller positions along the upstream flow direction.

19. The process of claim 1, wherein the process is carried out on a four engine propeller-driven aircraft with two propellers mounted on each wing, wherein the two propellers mounted on the same wing are adjusted with regard to frequency, amplitude, and phase so that the sound fields of the two propellers overlap in the area of a nearest critical fuselage surface of the aircraft so that they are clearly attenuated or in the ideal case even completely extinguished.

20. A multi-engine propeller-driven aircraft comprising means for adjusting parameters of at least two of the propellers with respect to each other with regard to frequency, amplitude, and phase in such a way that the sound fields of the propellers are attenuated or extinguished completely by interference of the direct noise emission of the at least two propellers at a nearest outer skin area of a fuselage of the aircraft.

21. A multi-engine propeller-driven aircraft according to claim 20, wherein at least the basic sound pitch of the propellers is considered in the adjustment of the engine parameters.

22. A multi-engine propeller-driven aircraft according to claim 21, wherein in addition to the basic sound pitch, also additional propeller sound pitches are considered in the adjustment of the engine parameters.

23. A multi-engine propeller-driven aircraft according to claim 20, wherein blades of the propellers are selected and adjusted in such a way that the product of the blades and the rotation speed are identical for at least two of the propellers.

24. A multi-engine propellers-driven aircraft according to claim 20, wherein the adjustment of the frequencies of the propeller takes place by adjusting at least one of the number of blades and the rotation speed of the propellers.

25. A multi-engine propeller-driven aircraft according to claim 20, wherein the adjustment of the phases of the propellers takes place by one or several of the following measures:

adjusting the distances between the propellers, adjusting the position of respective ones of the propellers along the flow direction, adjusting with respect to each other the current blade position angle or the phase differences in the propeller blade sequence, and adjusting the propeller rotation direction.

26. A multi-engine propeller-driven aircraft according to claim 20, wherein the adjustment of the amplitudes of the propellers takes place by one or several of the following measures:

adjusting the blade geometry, adjusting the rotation speed, adjusting the blade angle, adjusting the upstream flow conditions, adjusting the distance of the propellers to a critical area of the fuselage structure, and adjusting the propeller positions along the upstream flow direction.

27. A multi-engine propeller-driven aircraft according to claim 20, wherein the process is carried out on a four engine propeller-driven aircraft with two propellers mounted on each wing, wherein the two propellers mounted on the same wing are adjusted with regard to frequency, amplitude, and phase so that the sound fields of the two propellers overlap in the area of a nearest critical fuselage surface of the aircraft so that they are clearly attenuated or in the ideal case even completely extinguished.

28. A process for noise reduction in multi-engine propeller-driven aircraft, wherein parameters of at least two of the propellers are adjusted with respect to each other with regard to frequency, amplitude, and phase in such a way that the sound fields of the propellers are attenuated or extinguished completely by interference in a nearest outer skin area of a fuselage of the aircraft;

wherein at least the basic sound pitch of the propellers is considered in the adjustment of the engine parameters; and wherein in addition to the basic sound pitch, also additional propeller sound pitches are considered in the adjustment of the engine parameters.

29. The process of claim 28, wherein the adjustment of the frequencies of respective ones of the propellers takes place by adjusting at least one of the number of blades and the rotation speed of the propellers.

30. The process of claim 28, wherein the adjustment of the phases of respective ones of the propellers takes place by one or several of the following measures:

adjusting the distances between the propellers, adjusting the position of the propellers along the flow direction, adjusting with respect to each other the current blade position angle or the phase differences in the propeller blade sequence, and adjusting the propeller rotation direction.

31. The process of claim 28, wherein the adjustment of the amplitudes of the propellers takes place by one or several of the following measures:

adjusting the blade geometry, adjusting the rotation speed, adjusting the blade angle, adjusting the upstream flow conditions, adjusting the distance of the propellers to a critical area of the fuselage structure, and adjusting the propeller positions along the upstream flow direction.

32. A multi-engine propeller-driven aircraft comprising means for adjusting parameters of at least two of the propellers with respect to each other with regard to frequency, amplitude, and phase in such a way that the sound fields of the propellers are attenuated or extinguished completely at a nearest outer skin area of a fuselage of the aircraft;

wherein at least the basic sound pitch of the propellers is considered in the adjustment of the engine parameters;

wherein in addition to the basic sound pitch, also additional propeller sound pitches are considered in the adjustment of the engine parameters.

33. A process for noise reduction in multi propeller-driven aircraft of the type having a fuselage structure and at least two propellers disposed at one side said fuselage structure, which propellers both generate airborne noise directly affecting a fuselage skin area closest to the propellers, said process comprising:

adjusting operating parameters of the at least two propellers with respect to each other with regard to frequency, amplitude, and phase such that sound fields of the propellers are attenuated by interference at said fuselage skin area location.

34. A process according to claim 33, wherein said at least two propellers consists of two propellers at one side of the fuselage, and wherein said adjusting operating parameters includes shifting sound field phases of the two propellers by approximately 180° at the fuselage skin area location.

35. A process according to claim 33, wherein the aircraft is of the type having a pair of wings disposed at respective opposite lateral sides of a fuselage and two propellers disposed on each wing, said fuselage including a respective fuselage skin area closest to the propellers at each side of the fuselage, said process including adjusting operating parameters to maximally attenuate the sound fields of the respective propellers at respective sides of the fuselage by interference at the respective fuselage skin area nearest to the propellers.

* * * * *